United States Patent [19]

Tsvetkov et al.

[11] 4,379,184

[45] Apr. 5, 1983

[54] PROCESS FOR FORMING A REFLECTING COPPER COATING ON A FACE OF A GLASS SUBSTRATE

[76] Inventors: Nikolai S. Tsvetkov, ulitsa Peskovaya, 31, kv. 4; Igor I. Maleev, ulitsa Goncharova, 29, kv. 13; Irina E. Opainich, ulitsa Fedorova, 12, kv. 13; Lidia A. Lobkovskaya, ulitsa Uzhgorodskaya, 7, kv. 5; Alexandr R. Bogush, ulitsa Nauchnaya, 105, kv. 105; Alexandra D. Sozanskaya, ulitsa Engelsa, 35, kv. 2; Evgeny I. Onischak, ulitsa Marshala Rybalko, 12, kv. 72; Evgeny I. Gladyshevsky, ulitsa Saksaganskogo, 5, kv. 6; Mikhail D. Opainich, ulitsa Fedorova, 12, kv. 13, all of Lvov, U.S.S.R.

[21] Appl. No.: 299,880

[22] Filed: Sep. 8, 1981

[30] Foreign Application Priority Data

Feb. 28, 1979 [SU] U.S.S.R. ............................ 2743205
Dec. 20, 1979 [SU] U.S.S.R. ............................ 2849301

[51] Int. Cl.$^3$ .................. B05D 1/36; B05D 3/02; B05D 5/06; G02B 5/08
[52] U.S. Cl. ................................ 427/169; 427/108; 427/162
[58] Field of Search ................. 427/169, 162, 108

[56] References Cited

U.S. PATENT DOCUMENTS 3,093,509  6/1963  Wein ............................ 427/169 X Primary Examiner—James R. Hoffman
Attorney, Agent, or Firm—Lilling & Greenspan

[57] ABSTRACT

A process for forming a reflecting copper coating on a face of a glass substrate, consisting in activating the glass face in a 0.0005 to 0.007% by weight aqueous solution of $SnCl_2.2H_2O$ and a 0.005 to 0.15% by weight aqueous solution of $AgNO_3$, chemically coating the activated face of the glass substrate with copper for 3 to 15 minutes in a coppering solution preheated to 30° to 65° C., followed by stabilizing the coated face of the glass substrate with an aqueous solution of a stabilizer and drying thereof.

7 Claims, No Drawings

PROCESS FOR FORMING A REFLECTING COPPER COATING ON A FACE OF A GLASS SUBSTRATE

BACKGROUND OF THE INVENTION

1. Field of the Invention

The present invention relates to the art of coating glass with metals and more particularly to a process for forming a reflecting copper coating on a face of a glass substrate.

The invention may prove most advantageous in the production of vacuum flasks, in electronics, as well as in the production of translucent glass, and colored filters.

A coating technique currently in wide use in the production of vacuum flasks is that of silvering.

To form the above-mentioned coatings, however, a precious metal, namely silver, is to be used, the world reserves of which are limited. It seems reasonable therefore to make use of base metals when forming reflecting coatings. Specifically, copper coatings are of practical significance. Yet the conventional processes for forming metal coatings on a face of a glass substrate do not provide copper coatings which are sufficiently reflective. In solving this problem a copper coating formed by reducing copper from aqueous solutions of copper salts is of practical significance.

2. Description of the Prior Art

Known in the art is a process for forming a copper coating on a face of a glass substrate by reducing the metal from aqueous solutions of copper salts (M. Shalkauskas, V. Vashkyami, Khimicheskaya metallizatsia plastmass (Chemical coating of plastics with metals), Leningrad, "Khimiya" publishers, 1977, pp. 51–65 and 95–97) comprising the following steps:

activating the glass face, which is carried out in two stages of which the first one (sensitization) consists in treating the glass face with a sensitizer, namely an aqueous solution containing

| $SnCl_2.2H_2O$ | 40 to 50 g/l |
|---|---|
| 35% HCl | 40 to 50 ml/l, | and after the treatment the thus sensitized glass face is washed with water and dried; the second stage (activation proper) consists in treating the washed and dried sensitized face with an aqueous solution of an activator, heated to 50° to 60° C. and containing

| $AgNO_3$ | 2 to 90 g/l |
|---|---|
| 25% $NH_3$ | 10 to 100 ml/l, and | and then the thus activated face is dried; and chemically coating the activated face of a glass substrate for 20 to 25 minutes in a coppering solution at an ambient temperature ranging from 70° to 80° C.;

drying the copper coated glass face.

The best of the conventional coppering solutions is that which is prepared by mixing the following two solutions:

| solution I | |
|---|---|
| copper sulphate | 13 g |
| nickel chloride | 4 g |
| formalin | 50 ml |

| -continued | |
|---|---|
| water | 1000 ml |
| solution II | |
| sodium hydroxide | 10 g |
| Rochelle salt | 43 g |
| sodium carbonate | 4 g |
| water | 1000 ml |

(See B. Ya. Kaznachey, Galvanoplastika v promyshlennosti, Gosizdatmestprom RSFSR, Moscow, 1955, p.56).

Sensitization of the glass face with the above-mentioned sensitizer comprising from 40 to 50 g/l of $SnCl_2.2H_2O$ requires that a sensitized face be washed with water whereby hydrolysis of $SnCl_2.2H_2O$ occurs, which is a critical requirement for sensitization of a glass face to be effected.

A great amount of the hydrolysis products occurring on the glass face dissolve and by reducing silver ions in the process of activation form slime in the activator solution.

Moreover, sensitization of the glass face with the above-mentioned sensitizer brings about a considerable dependence of structure and amount of the adsorbed products on the shape of the face. When surfaces similar to vacuum flasks and the like are washed, the acid present in the sensitizer is not washed away at a time from different portions of the surface. This results in uneven deposition of silver particles onto the surface in carrying out the step of activation and hence an uneven copper coating is formed on this surface, thus making it impossible to produce a reflecting copper coating and affecting its adhesion to the surface being coated.

To make the activation process more effective it has been proposed that an aqueous solution of an activator containing 2 to 90 g/l of $AgNO_3$ and 10 to 100 ml/l of 25% $NH_3$ be heated to a temperature in the range from 50° to 60° C.

However a hot solution of the activation impairs adhesion of the copper coating to the glass surface coated by a chemical process. And again, ammonia present in the solution of the activator deteriorates the quality of the copper coating being produced.

Furthermore, the activation step carried out on a sensitized surface in the above solution of the activator containing substantial quantities of $AgNO_3$ requires that the sensitized surface be dried to improve adhesion thereof with silver particles.

It is also to be noted that such a solution of the activator that comprises a considerable amount of $AgNO_3$ cannot be used repeatedly since the content of $AgNO_3$ will undergo a relatively speedy change due to loss of finely-divided silver particles, which results in an unstable activation of the glass surface.

It is also worth consideration that the step of chemically coating the glass face is carried out at an ambient temperature of 70° to 80° C. thus requiring extra equipment for maintaining such temperature.

SUMMARY OF THE INVENTION

The principal object of this invention is to provide a process for forming a reflecting copper coating on a face of a glass substrate, which permits forming a uniform and sound reflecting copper coating.

Another object of the present invention is to provide a process for forming a reflecting copper coating on a face of a glass substrate, displaying adequate adhesion to the coated surface.

A further object of the present invention is to provide a process for forming a reflecting copper coating on a face of a glass substrate, having sufficient stability against oxidation.

Still another object of the present invention is to provide a process for forming a reflecting copper coating on a face of a glass substrate, that may be practiced on surfaces having a complex configuration.

Other objects and advantages of the present invention will appear from the following description.

These and other objects of the invention are attained in a process for forming a reflecting copper coating on a face of a glass substrate, consisting in activating the glass face in an aqueous solution containing $SnCl_2.2H_2O$ and then in an aqueous solution containing $AgNO_3$ with subsequent chemical coating thereof in a coppering solution and drying. According to the invention, the activation of the glass face is carried out in a 0.0005 to 0.007% by weight aqueous solution of $SnCl_2.2H_2O$ and a 0.005 to 0.15% by weight aqueous solution of $AgNO_3$, and the glass face is further chemically coated for 3 to 15 minutes in a coppering solution preheated to 30° to 65° C., then stabilized with an aqueous solution of a passivator.

The solution of $SnCl_2.2H_2O$ used for the activation brings about the formation of a very thin film of hydrolysis products on the glass face being coated, while the solution of $AgNO_3$ for activating the sensitized face permits deposition on the same face of a sound and very thin layer of silver particles. The silver particles are the catalytic centers wherein the copper reduction starts. It is to be noted that due to the sensitization of the glass face with the solution of $SnCl_2.2H_2O$ no slime is formed in the activation solution. The formation of a very thin layer of silver particles on the thus sensitized glass face is assumed to promote, while carrying out subsequent steps such as the chemical coating, the stabilizing, and the drying according to the invention, a uniform, sound, and oxidation-stable reflecting copper coating which exhibits adequate adhesion to the coated surface.

To speed up the process of metal coating and to improve the activation of the glass face, the latter is preferably heated to 30° to 60° C. in a thermostatically controlled atmosphere.

It is advisable that the step of chemically coating the glass substrate with metal be carried out at an ambient temperature of 10° to 25° C.

To prevent oxidation of the metal coating on the glass face, the coating is treated with a 0.0001 to 0.5% by weight aqueous solution of a stabilizer.

The stabilizer may preferably be Rochelle salt, sodium ethylenediaminotetramethyl carbonate, ethylene diamine tetraacetic acid, formalin, propyl alcohol, or triethanolamine.

In order to form a uniform, sound, and oxidation-stable reflecting copper coating which exhibits adequate adhesion to a glass surface of the kind similar to a vaccum flask and the like, the step of drying such surfaces is suitably carried out under a vacuum of the order of $10^{-3}$ mm Hg at 25° to 70° C. for 5 to 25 minutes.

The glass surface is preferably coated in a coppering solution containing the following components, % by weight:

| | |
|---|---|
| copper sulphate | 0.4 to 3.6 |
| nickel chloride | 0.4 to 3.6 |
| sodium hydrate | 0.2 to 3.2 |
| Rochelle salt | 1.8 to 16.0 |
| sodium carbonate | 0.3 to 2.4 |
| potassium nitrate | 0.2 to 1.6 |
| formalin, 40% aqueous solution | 1.2 to 9.0 |
| water | 95.5 to 60.6 |

The above coppering solution makes it possible to form on a transport glass substrate a sound reflecting copper coating at both sides thereof and exhibiting adequate adhesion to the surface coated.

DETAILED DESCRIPTION OF THE INVENTION

A reflecting copper coating on a face of a glass substrate, according to the invention, is formed as follows.

A disposed glass substrate or the one similar to a vacuum flask or the like is heated to a temperature of 30° to 60° C. in a temperature-controlled cabinet whereupon it is activated.

To effect the step of activation, the glass substrate heated to the above temperature is subjected to treatment with a sensitizer for 5 to 25 sec, the sensitizer being a 0.0005 to 0.007% by weight aqueous solution of $SnCl_2.2H_2O$, and then for 5 to 25 sec with an aqueous solution of an activator, the latter being a 0.005 to 0.15% by weight aqueous solution of $AgNO_3$. This activator solution may be re-used.

Following the step of activation the activated surface is coated with a metal, while maintaining an ambient temperature in the range of 10° to 25° C. To this end the surface is treated in a preliminarily heated coppering solution to 30° to 65° C. for 3 to 15 minutes until the copper coating is 0.3 to 1.5 μm thick. The coppering solution may preferably be a solution containing the following in % by weight:

| | |
|---|---|
| copper sulphate | 0.4 to 3.6 |
| nickel chloride | 0.4 to 3.6 |
| sodium hydrate | 0.2 to 3.2 |
| Rochelle salt | 1.8 to 16.0 |
| sodium carbonate | 0.3 to 2.4 |
| potassium nitrate | 0.2 to 1.6 |
| formalin, 40% aqueous solution | 1.2 to 60.0 |
| water | 95.5 to 60.0 |

The glass surface thus coated with a metal undergoes stabilization with a 0.0001 to 0.5% by weight aqueous solution of a stabilizer for 5 to 20 sec. As a passivator there may be used Rochelle salt, sodium ethylenediaminotetramethyl carbonate, ethylene diamine tetraacetic acid, formalin, propyl alcohol, or triethanolamine.

Next the copper coated and stabilized glass substrate is washed with water and dried.

If the surface is exposed it is dried under atmosphere pressure for 2 to 30 minutes at a temperature of 30° to 100° C. In order to form a uniform, sound, and oxidation-stable reflecting copper coating which exhibits adequate adhesion to a glass surface of the kind similar to a vacuum flask and the like, the step of drying such surfaces is carried out in a vacuum of the order of $10^{-3}$ mm Hg at 25° to 70° C. for 5 to 25 minutes.

EXAMPLE 1

A reflecting copper coating on a face of a glass substrate according to the invention was formed as follows.

A transparent glass plate 3 cm wide and 10 cm long was heated to a temperature of 35° C. in a thermostatically controlled cabinet and then activated. For effecting the activation process, the plate was immersed into a 0.009% by weight aqueous solution of $SnCl_2.2H_2O$ for 12 seconds (sensitization) and then for 5 seconds into a 0.15% by weight aqueous solution of $AgNO_3$ (activation proper). Then the step of coating the activated glass plate with metal followed. In doing this, the plate was immersed into a coppering solution preheated to a temperature of 30° C., while maintaining the ambient temperature at 20° C., and held in the solution for 15 minutes.

The coppering solution used was a solution containing the following components, % by weight:

| | |
|---|---|
| copper sulphate | 0.4 |
| nickel chloride | 0.4 |
| sodium hydrate | 0.2 |
| Rochelle salt | 1.8 |
| Sodium carbonate | 0.3 |
| formalin, 40% aqueous solution | 0.2 |
| potassium nitrate | 1.2 |
| water | 95.5 |

Next the thus coated glass plate was subjected to a stabilization process by immersing the same into a 0.009% by weight aqueous solution of sodium ethylendiaminotetramethyl carbonate for 5 seconds, then the plate was washed with water and dried. The drying step was carried out under atmospheric pressure conditions at 100° C. for 2 minutes.

The thus processed glass plate was both a first-surface mirror and second-surface mirror.

The reflecting power of the copper coating formed on the glass plate was determined in the light wavelengths ranging from 640 to 750 mm against a baryta plate, the reflecting power of which was assumed as being 100%.

The test results were as follows:

| | |
|---|---|
| Reflecting power of the first-surface mirror | 81% |
| Reflecting power of the second-surface mirror | 82% |

EXAMPLE 2

A reflecting copper coating on a face of a glass substrate, according to the invention, was formed as follows.

A transparent glass plate 3 cm wide and 10 cm long was heated to a temperature of 60° C. in a thermostatically-controlled cabinet and then activated. For effecting the activation process, the plate was immersed into a 0.007% by weight aqueous solution of $SnCl_2.2H_2O$ for 5 seconds (sensitization) and then for 20 seconds into a 0.01% by weight aqueous solution of $AgNO_3$ (activation proper). Then the step of coating the activated glass plate with metal followed. In doing this the plate was immersed into a coppering solution preheated to a temperature of 60° C., while maintaining the ambient temperature at 10° C., and held in the solution for 7 minutes.

The coppering solution used was a solution containing the following components, % by weight:

| | |
|---|---|
| copper sulphate | 1.8 |
| nickel chloride | 1.0 |
| sodium hydrate | 1.5 |
| Rochelle salt | 7.6 |
| sodium carbonate | 0.9 |
| potassium nitrate | 0.6 |
| formalin, 40% aqueous solution | 4.2 |
| water | 82.4 |

Next the thus coated glass plate was subjected to a stabilization step by immersing the same into a 0.5% by weight aqueous solution of triethanolamine for 15 seconds, then the plate was washed with water and dried. The drying step was carried out under atmospheric pressure conditions at 30° C. for 30 minutes.

The thus processed glass plate was both a first-surface mirror and second-surface mirror.

The reflecting power of the copper coating formed on the glass plate was determined in the light wavelengths ranging from 640 to 750 nm against a baryta plate, the reflecting power of which was assumed as being 100%.

The test results were as follows:

| | |
|---|---|
| Reflecting power of the first-surface mirror | 84% |
| Reflecting power of the second-surface mirror | 86% |

EXAMPLE 3

A reflecting copper coating on a face of a glass substrate according to the invention was formed as follows.

A transparent glass substrate, namely a vacuum flask of 0.25 liter capacity was heated to a temperature of 50° C. in a thermostatically-controlled cabinet and then activated. For effecting the activation process, the vacuum flask was filled with a 0.003% by weight aqueous solution of $SnCl_2.2H_2O$ for 9 seconds (sensitization) and then for 25 seconds with a 0.005% by weight aqueous solution of $AgNO_3$ (activation proper). Then the step of coating of the activated inner surface of the vacuum flask with metal followed. In doing this the vacuum flask was filled with a coppering solution preheated to a temperature of 65° C., while maintaining the ambient temperature at 15° C., and held with the coppering solution therein for 3 minutes after which time the coppering solution was evacuated.

The coppering solution used was a solution containing the following components, % by weight:

| | |
|---|---|
| copper sulphate | 3.6 |
| nickel chloride | 3.6 |
| sodium hydrate | 3.2 |
| Rochelle salt | 16.0 |
| sodium carbonate | 2.4 |
| potassium nitrate | 1.6 |
| formalin, 40% aqueous solution | 9.0 |
| water | 60.6 |

Next the thus coated inner surface of the vacuum flask was stabilized.

To carry out stabilization, the vacuum flask was filled with a 0.001% by weight aqueous solution of Rochelle salt and held for 20 seconds and then the solution was evacuated, the flask was washed with water and dried.

The flask was dried in a vacuum on the order of $10^{-3}$ mm Hg at 25° C. for 20 minutes.

The copper coating on a transparent glass substrate which was an inner surface of a vacuum flask produced both a first-surface mirror and second-surface mirror.

The vacuum flask was tested for heat-insulating capacity. The test was as follows. The vacuum flask was filled with water having a temperature of 95° C. at an ambient temperature of 15° C. The flask was closed and left for 12 hours. After the 12-hour time the flask was opened and the temperature of the water was 70° C.

EXAMPLE 4

A reflecting copper coating on a face of a glass substrate, according to the invention, was formed as follows.

A transparent glass substrate, namely a vacuum flask of 0.25 liter capacity was heated to a temperature of 30° C. in a thermostatically-controlled cabinet and then activated. For effecting the activation process, the vacuum flask was filled with a 0.0005% by weight aqueous solution of $SnCl_2.2H_2O$ for 25 seconds/sensitization/ and then for 14 sec with a 0.09% by weight aqueous solution of $AgNO_3$/activation proper/. Then the step of coating the activated inner surface of the vacuum flask with metal followed. In doing this the vacuum flask was filled with a coppering solution preheated to a temperature of 40° C., while maintaining the ambient temperature at 25° C., and held with the coppering solution therein for 10 minutes after which time the coppering solution was evacuated. The coppering solution used was a solution containing the following components, % by weight:

| | |
|---|---|
| copper sulphate | 1.8 |
| nickel chloride | 1.0 |
| sodium hydrate | 1.5 |
| Rochelle salt | 7.6 |
| sodium carbonate | 0.9 |
| potassium nitrate | 0.6 |
| formalin, 40% aqueous solution | 4.2 |
| water | 82.4 |

Next the thus coated inner surface of the vacuum flask was stabilized.

To carry out stabilization, the vacuum flask was filled with a 0.006% by weight aqueous solution of ethylene diamine tetraacetic acid for 10 seconds, the solution was evacuated, and the flask was washed with water and dried. The flask was dried in a vacuum on the order of $10^{-3}$ mm Hg at 70° C. for 20 minutes.

The copper coating on a transparent glass substrate which was an inner surface of a vacuum flask produced both a first-surface mirror and second-surface mirror.

The vacuum flask was tested for heat-insulating capacity. The test was as follows. The vacuum flask was filled with water having a temperature of 95° C. at an ambient temperature of 15° C. The flask was closed and left for 12 hours. After the 12-hour time the flask was opened and the temperature of the water as taken was 70° C.

EXAMPLE 5

A reflecting copper coating on a face of a glass substrate, according to the invention, was formed as follows.

A transparent glass plate 3 cm wide and 10 cm long was heated to a temperature of 35° C. in a thermostatically-controlled cabinet and then activated. For effecting the activation process, the plate was immersed into a 0.0009% by weight aqueous solution of $SnCl_2.2H_2O$ for 15 seconds (sensitization) and then for 8 seconds into a 0.1% by weight aqueous solution of $AgNO_3$ (activation proper). Then the step of coating the activated glass plate with metal followed. In doing this the plate was immersed into a coppering solution preheated to a temperature of 62° C., while maintaining the ambient temperature at 23° C., and held in the solution for 14 minutes.

The coppering solution used was a solution containing the following components, % by weight:

| | |
|---|---|
| copper sulphate | 0.66 |
| sodium carbonate | 0.19 |
| Rochelle salt | 2.12 |
| nickel chloride | 0.19 |
| sodium hydrate | 0.30 |
| potassium nitrate | 01.2 |
| formalin, 40% aqueous solution | 2.44 |
| water | 93.98 |

Next the thus coated glass plate was subjected to a stabilization step by immersing the same into a 0.0001% by weight aqueous solution of formalin for 20 seconds, then the plate was washed with water and dried. The drying step was carried out under atmospheric pressure conditions at 60° C. for 15 minutes.

The thus processed glass plate was both a first-surface mirror and second-surface mirror.

The reflecting power of the copper coating formed on the glass plate was determined in the light wavelengths ranging from 640 to 750 nm. The procedure for determining a reflecting power has been described above. The test results were as follows:

| | |
|---|---|
| Reflecting power of the first-surface mirror | 77% |
| Reflecting power of the second-surface mirror | 79% |

EXAMPLE 6 (negative)

A reflecting copper coating on a face of a glass substrate was formed substantially as in Example 1.

The face of the glass substrate was sensitized in an aqueous solution having a concentration of 0.0003% by weight $SnCl_2.2H_2O$, which is somewhat lower than the minimum concentration of $SnCl_2.2H_2O$ according to the invention.

The above-mentioned concentration of $SnCl_2.2H_2O$ in water used for sensitizing the glass substrate led to an unsound and non-uniform coating.

EXAMPLE 7 (negative)

A reflecting copper coating on a face of a glass substrate was formed substantially as in Example 2.

The face of the glass substrate was sensitized in an aqueous solution having a concentration of 0.009% by weight $SnCl_2.2H_2O$, which is somewhat higher than the maximum concentration of $SnCl_2.2H_2O$ according to the invention.

The above-mentioned concentration of $SnCl_2.2H_2O$ in water used for sensitizing the glass substrate led to a non-uniform coating.

EXAMPLE 8 (negative)

A reflecting copper coating on a face of a glass substrate was formed substantially as in Example 1.

The glass substrate was coated with metal in a coppering solution containing the following components, % by weight:

| | |
|---|---|
| copper sulphate | 0.9 |
| nickel chloride | 0.7 |
| sodium hydrate | 0.09 |
| Rochelle salt | 3.5 |
| sodium carbonate | 0.15 |
| potassium nitrate | 0.15 |
| formalin, 40% aqueous solution | 2.6 |
| water | 91.91 |

Some components (sodium hydrate, sodium carbonate, and potassium nitrate) are in lower amounts than is contemplated by the present invention.

In consequence, the process of coating the glass substrate slowed down to one hour, the copper coating being a dull brown color.

EXAMPLE 9 (negative)

A reflecting copper coating on a face of a glass substrate was formed substantially as in Example 1.

The glass substrate was coated with metal in a coppering solution containing the following components, % by weight:

| | |
|---|---|
| copper sulphate | 4.5 |
| nickel chloride | 3.0 |
| sodium hydrate | 3.2 |
| Rochelle salt | 19.0 |
| sodium carbonate | 5.0 |
| potassium nitrate | 3.5 |
| formalin, 40% aqueous solution | 9.0 |
| water | 52.8 |

Some components (copper sulphate, Rochelle salt, sodium carbonate, potassium nitrate) are in higher amounts than is contemplated by the present invention.

In consequence, the process of coating the glass substrate speeded up to 2 minutes, and the coating formed was unsound and non-uniform due to poor adhesion with the glass face.

While particular ways of practicing the invention have been described, various modifications thereof will be apparent to those skilled in the art and therefore it is not intended that the invention be limited to the disclosed examples and departures may be made therefrom within the spirit and scope of the invention as defined in the claims.

What is claimed is:

1. A process for forming a reflecting copper coating on a face of a glass substrate, comprising the steps of:
   (a) activating the glass face by contacting it with a 0.0005 to 0.007% by weight aqueous solution of $SnCl_2.2H_2O$ to sensitize it, then contacting, the sensitized glass face with a 0.005 to 0.15% by weight aqueous solution of $AgNO_3$;
   (b) chemically coating the activated face of the glass substrate with copper for 3 to 15 minutes in a coppering solution preheated to 30° to 65° C.;
   (c) stabilizing the coated fact of the glass substrate with an aqueous solution of a stabilizer;
   (d) drying the stabilized copper coated face of the glass substrate.

2. A process as claimed in claim 1, wherein the glass substrate is heated to 30° to 60° C. in a thermostatically controlled atmosphere prior to the step of activation.

3. A process as claimed in claim 1, wherein the step of chemically coating the glass substrate with metal is carried out at an ambient temperature of 10° to 25° C.

4. A process as claimed in claim 1, wherein the coated face of the glass substrate is stabilized in a 0.0001 to 0.5% by weight aqueous solution of a stabilizer selected from the group consisting of Rochelle salt, sodium ethylenediaminotetramethyl carbonate, ethylene diamine tetraacetic acid, formalin, propyl alcohol, and triethanolamine.

5. A process as claimed in claim 1, wherein the face of the glass substrate of the kind of or related to a vacuum flask is dried under vacuum.

6. A process as claimed in claim 5, wherein the step of drying is carried out under a vacuum of the order of $10^{-3}$ mm Hg at 25° to 70° C. for 5 to 25 minutes.

7. A process as claimed in claim 1 wherein the face of the glass substrate is chemically coated in a coppering solution containing the following components, % by weight:

| | |
|---|---|
| copper sulphate | 0.4 to 3.6 |
| nickel chloride | 0.4 to 3.6 |
| sodium hydrate | 0.2 to 3.2 |
| Rochelle salt | 1.8 to 16.0 |
| sodium carbonate | 0.3 to 2.4 |
| potassium nitrate | 0.2 to 1.6 |
| formalin, 40% aqueous solution | 1.2 to 9.0 |
| water | 95.5 to 60.6 |

* * * * *